Aug. 7, 1956 C. MADDOCK 2,757,704
AUTOMATIC RIM LOADING FIXTURE
Filed Jan. 5, 1953 7 Sheets-Sheet 3

INVENTOR.
CLIFFORD MADDOCK
BY
ATTORNEYS

INVENTOR.
CLIFFORD MADDOCK
BY
ATTORNEYS

United States Patent Office 2,757,704
Patented Aug. 7, 1956

2,757,704

AUTOMATIC RIM LOADING FIXTURE

Clifford Maddock, Windsor, Ontario, Canada, assignor to Kelsey-Hayes Wheel Company, Detroit, Mich., a corporation of Delaware Application January 5, 1953, Serial No. 329,611

17 Claims. (Cl. 153—29)

This invention relates generally to apparatus for rolling annular blanks to a predetermined cross sectional contour and refers more particularly to improved means for feeding the blanks to the forming rolls.

In rim rolling machines, for example, it is customary to provide pairs of forming rolls arranged with the rolls of each pair in opposed relationship and open at one side to enable placing the wall of a rim blank between the opposed rolls. At least one roll of each pair is driven and means is provided for supporting the rolls for relative movement toward and away from one another.

In accordance with this invention rim blanks are successively moved into operative relationship with the opposed pairs of forming rolls by loading apparatus which reduces manual handling of the blanks to a minimum. One form of apparatus capable of performing the above results is shown in the accompanying drawings wherein:

Figure 5:
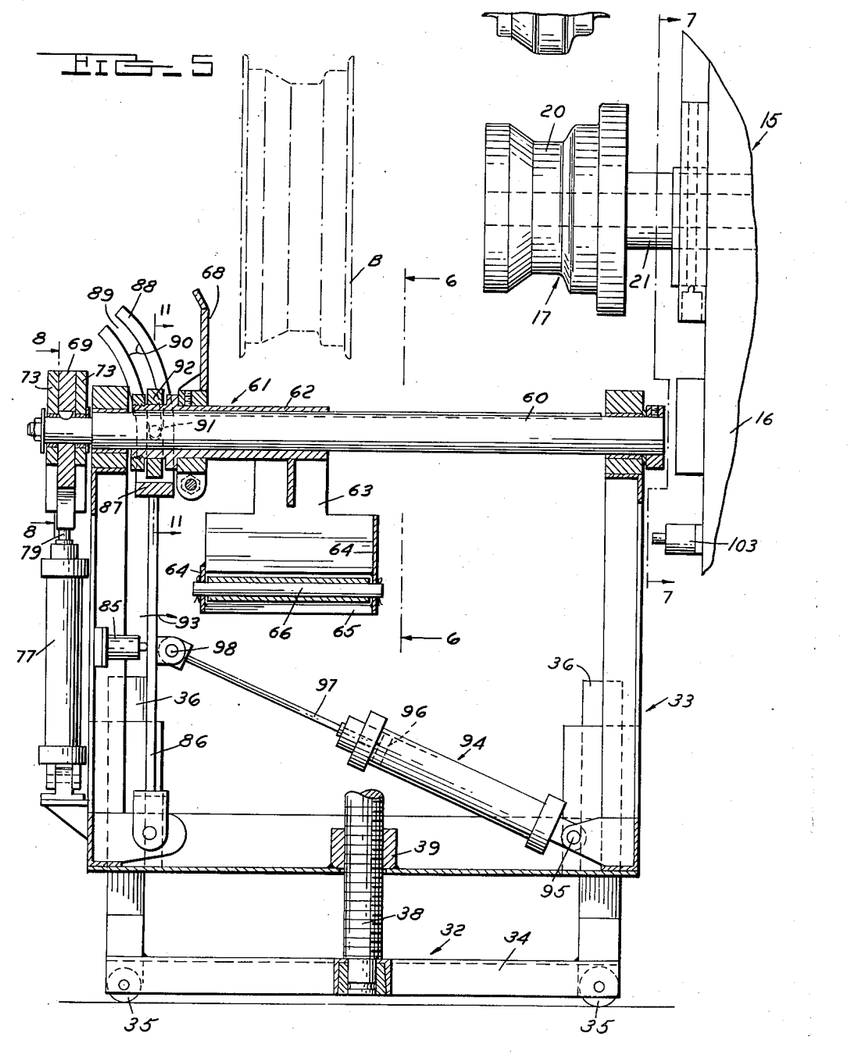
Figure 7:
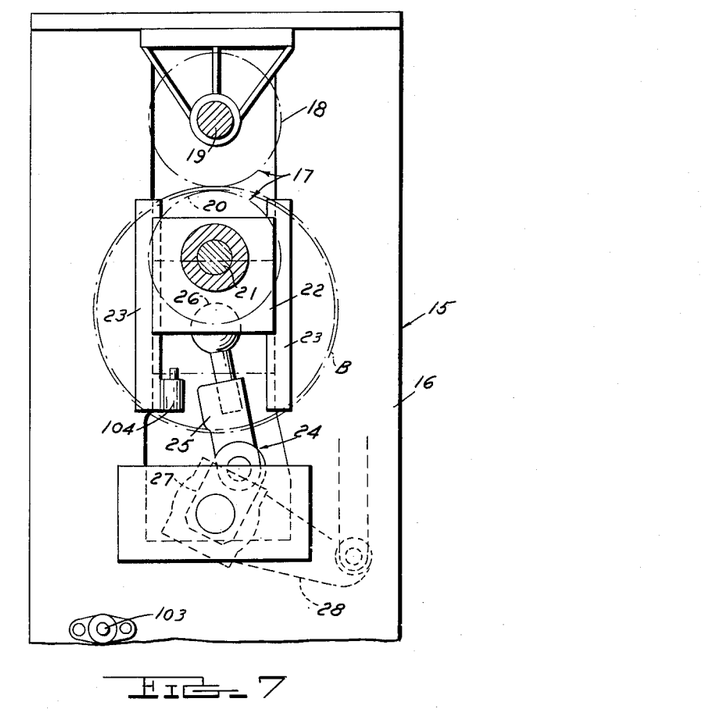
Figure 7 is a sectional view taken on the line 7—7 of Figure 5 and showing a part of the rim rolling machine in connection with which the apparatus forming the subject matter of this invention is used.

The apparatus forming the subject matter of this invention is adapted to be supported at the open side of a conventional rim rolling machine and may be attached in any suitable manner, not shown herein, to the base of the rolling machine. A part of a typical rolling machine is indicated in Figures 5 and 7 of the drawings by the numeral 15. Briefly, the rolling machine comprises a frame 16 and a pair of opposed forming rolls 17. The top roll 18 is mounted on a shaft 19 and the bottom roll 20 is secured to a shaft 21 having its axis extending parallel to the shaft 19 and located in a common vertical plane with the axis of the shaft 19. The shaft 21 is journalled on a block 22 and the latter is supported on the frame 16 for vertical sliding movement by ways 23. The block 22 is moved vertically relative to the ways 23 by a toggle 24 having one arm 25 connected to the lower end of the block by a universal joint 26, and having the other arm 27 pivoted on the frame 16. The toggle 24 is operated by power means not shown herein and connected to the arm 27 of the toggle by a suitable lever 28. The arrangement is such that movement of the lever 28 in a counterclockwise direction (Figure 7) moves the bottom forming roll 20 upwardly into operative relationship with the top forming roll 18, and movement of the lever 28 in the opposite direction lowers the bottom forming roll 20 relative to the top roll 18. When the forming rolls 18, 20 are separated from one another sufficient space is provided therebetween to enable a rim blank B to be inserted over the bottom roll 20 with the wall of the rim positioned between the contoured peripheral surfaces of the forming rolls. In practice, the rim blank B is raised by the bottom forming roll 20 to clamp the wall of the rim between the peripheral surfaces of the opposed forming rolls so that rotation of the rolls fashions the rim blank to the cross sectional contour determined by the peripheral surfaces of said forming rolls.

Figure 1:
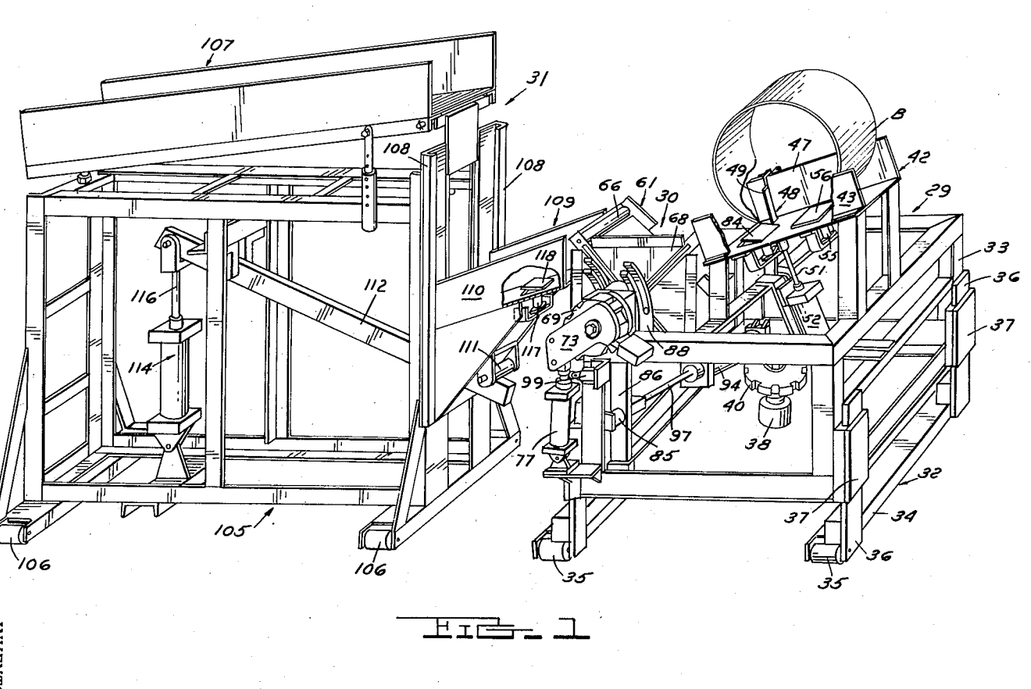
Figure 1 is a fragmentary perspective view of rim blank handling apparatus forming the subject matter of this invention.

As shown in Figure 1 of the drawings, the handling apparatus comprises generally rim blank loading mechanism 29, indexing mechanism 30, and conveyor mechanism 31. The rim blank loading mechanism 29 comprises a main frame 32 and an auxiliary frame 33. The main frame 32 has a base 34 provided with rollers 35 positioned to have a rolling engagement with the flooring or supporting surface at the open side of the rolling machine and enabling the base 34 to be readily moved into operative relationship with the rolling machine.

Figure 2:
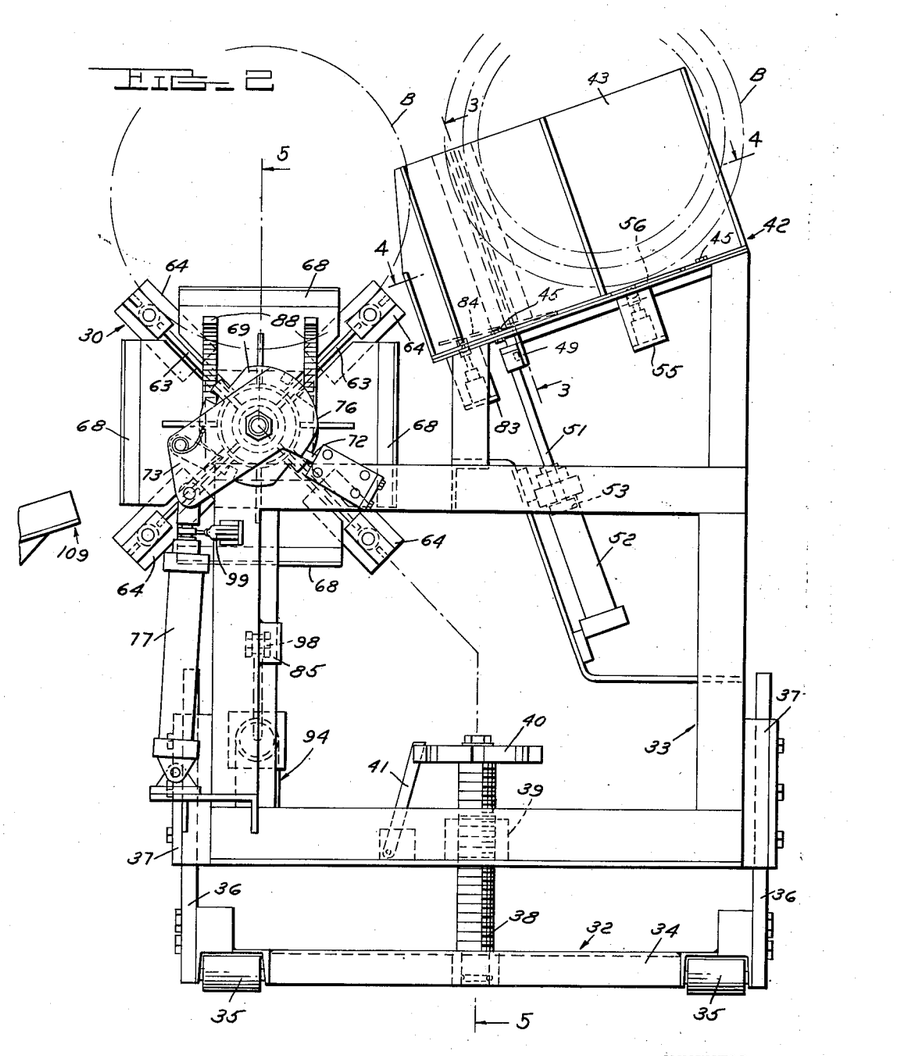
Figure 2 is a fragmentary side elevational view of a part of the apparatus shown in Figure 1.

Referring now to Figure 2 of the drawings, it will be noted that the auxiliary frame 33 is supported on the main frame 32 for vertical sliding movement relative to the latter. In detail, upstanding bars 36 are secured to opposite sides of the base 34 and are respectively received in vertical guides 37 suitably secured to the auxiliary frame 33. Also a vertical screw 38 is journalled at the lower end on the base 34 at the approximate geometrical center of the latter and a nut 39 is secured on the auxiliary frame in a position to threadably engage the screw 38. The top of the screw 38 has a disc 40 secured thereto notched at the periphery for cooperation with a suitable wrench to enable rotation of the screw 38 relative to the nut 39 to vary the elevation of the auxiliary frame 33. Accidental rotation of the screw is prevented by a latch 41 comprising an arm pivoted at the lower end to the auxiliary frame 33 for swinging movement and having the upper end selectively engageable in one of the notches formed in the disc 40. The purpose of the vertical adjustment for the auxiliary frame 33 is to enable varying the elevation of the indexing mechanism 30 to locate a rim blank B on the indexing mechanism in a position to enable placing the rim over the bottom forming roll 20 with the wall of the rim between the peripheral surfaces of the forming rolls.

Mounted on the auxiliary frame 33 at the top of the latter is a chute 42, channel-shaped in cross section and inclined in a downward direction from the front side of the auxiliary frame 33. The width of the chute 42 is of a dimension to freely receive a rim blank B and the location of the chute relative to the indexing mechanism 30 is such that the rim blank B is advanced by gravity to the indexing mechanism 30.

Figure 4:
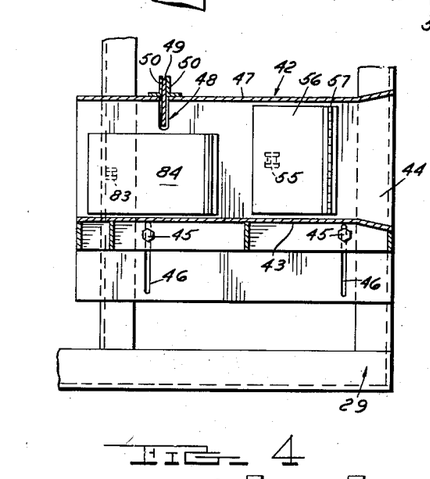

As shown in Figure 4 of the drawings, one wall 43 of the chute 42 is formed separately from the base 44 of the chute and is secured to the base by fastener elements 45 which extend through slots 46 formed in the base 44. The slots 46 are elongated in a direction transverse to the chute 42 and enable adjustment of the wall 43 toward and away from the opposite wall 47 of the chute to accommodate rim blanks of different axial widths.

Figure 3:
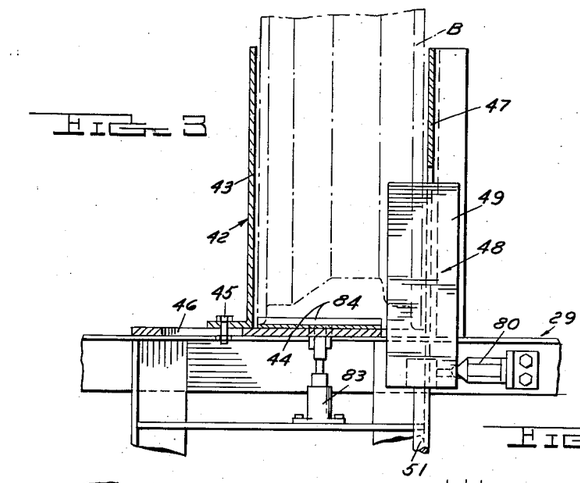
Figures 3, 4 and 5 are respectively sectional views taken substantially on the lines 3—3, 4—4 and 5—5 of Figure 2.

In order to maintain a rim blank in position on the chute 42 a vertically slidable gate 48 is provided adjacent the delivery end of the chute 42. As shown in Figures 1, 3 and 4 of the drawings the gate 48 comprises a plate 49 movable vertically through registering slots formed in the base 44 and side wall 47 of the chute. The plate 49 is guided vertically by angle bars 50 secured to the outer surface of the wall 47 at opposite sides of the slot through said wall and a substantial portion of the plate projects into the chute 42 in blocking engagement with a rim blank B. The lower end of the plate 49 is connected to the upper end of a piston rod 51 (Figs. 1, 2 and 12) and the lower end of the piston rod 51 projects into a cylinder 52 for connection to a piston 53 in said cylinder.

Figure 12:
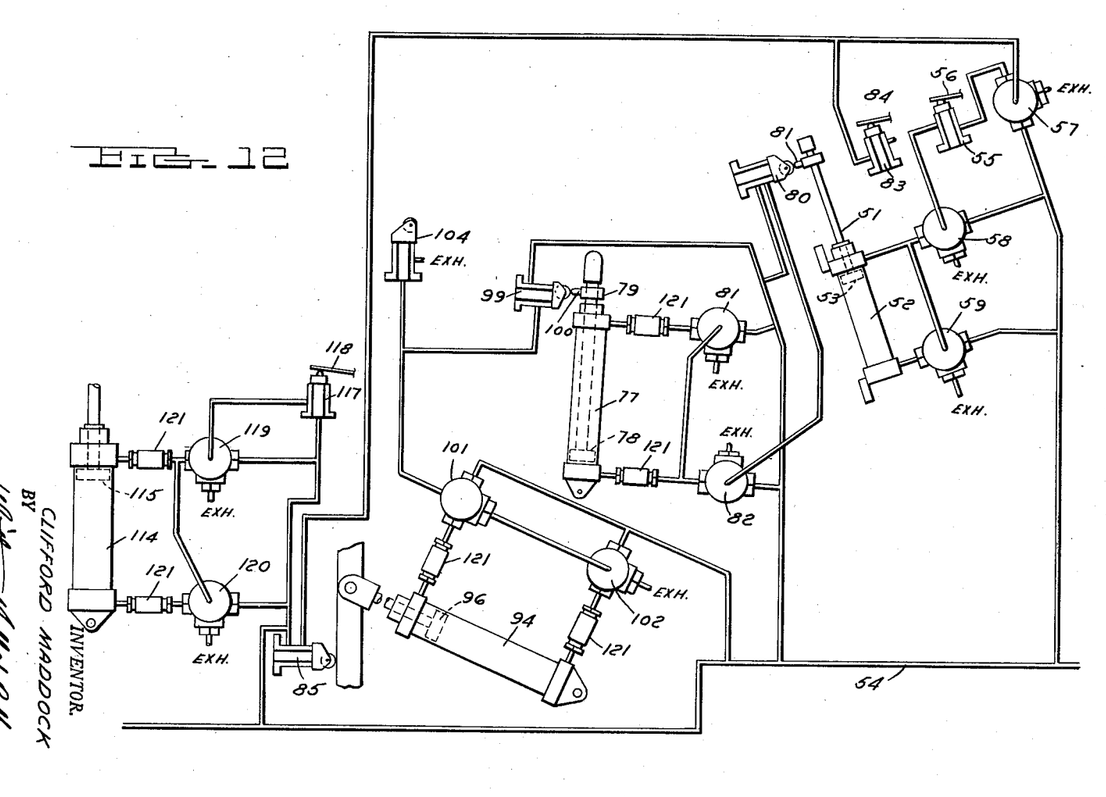
Figure 12 is a diagram illustrating the fluid pressure system employed for operating the various parts of the apparatus in timed relationship to relative movement of the forming rolls.

The cylinder 52 forms one part of the fluid pressure system shown in Figure 12 of the drawings for the purpose of illustration as a pneumatic system, and is connected to an air supply line 54 through the medium of suitable valves about to be described. In the present instance, the piston 53 in the cylinder 52 is operated to retract the gate 48 from the chute 42 by a three-way valve 55 supported beneath the chute 42 in advance of the gate 48. The valve 55 is operated by a flap 56 pivoted along its front edge to the base 44 by a hinge 57' (Fig. 4) and connected at its swinging end to the valve 55 through an opening in the base 44. The flap 56 is normally held by the valve 55 in a raised position and is operated by a rim blank B which is deposited on the upper end of the chute 42. As shown in Figure 12 of the drawings, the valve 55 is connected to the air supply line 54 through a three-way master valve 57 normally closed to exhaust. Operation of the valve 55 by downward movement of the flap 56 actuates a three-way normally closed time valve 58 to connect the upper end of the cylinder 52 to the air supply line and operates a three-way normally open valve 59 to connect the bottom of the cylinder to exhaust. Hence the piston 53 in the cylinder 52 is moved downwardly and the gate 48 is retracted from the chute 42.

The indexing mechanism 30 (Figures 1, 2, 5, 6 and 8) is positioned on the auxiliary frame 33 at the delivery end of the chute 42 and has a shaft 60 journaled at opposite ends on the auxiliary frame 33 with its axis extending parallel to the axes of the forming rolls 18 and 20. The shaft 60 forms a support for a fixture 61 having a tubular shaft 62 slidably mounted on the shaft 60 and keyed to the shaft 60 for rotation as a unit with the latter shaft. The fixture 61 is shown in Figure 5 of the drawings in its normal or outermost position relative to the rim rolling machine 15 and in this position registers with the delivery end of the chute 42 to receive rim blanks B from the chute.

Figure 6:
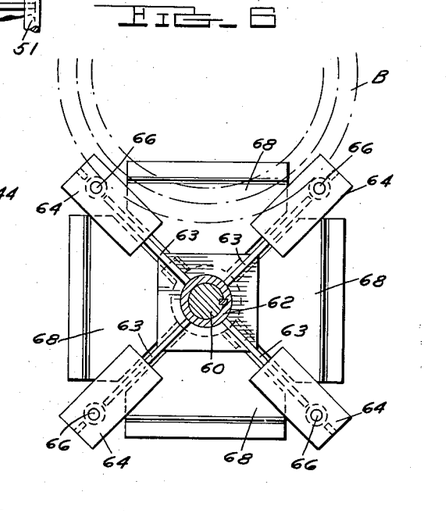
Figure 6 is a sectional view taken on the line 6—6 of Figure 5.
Figure 9:
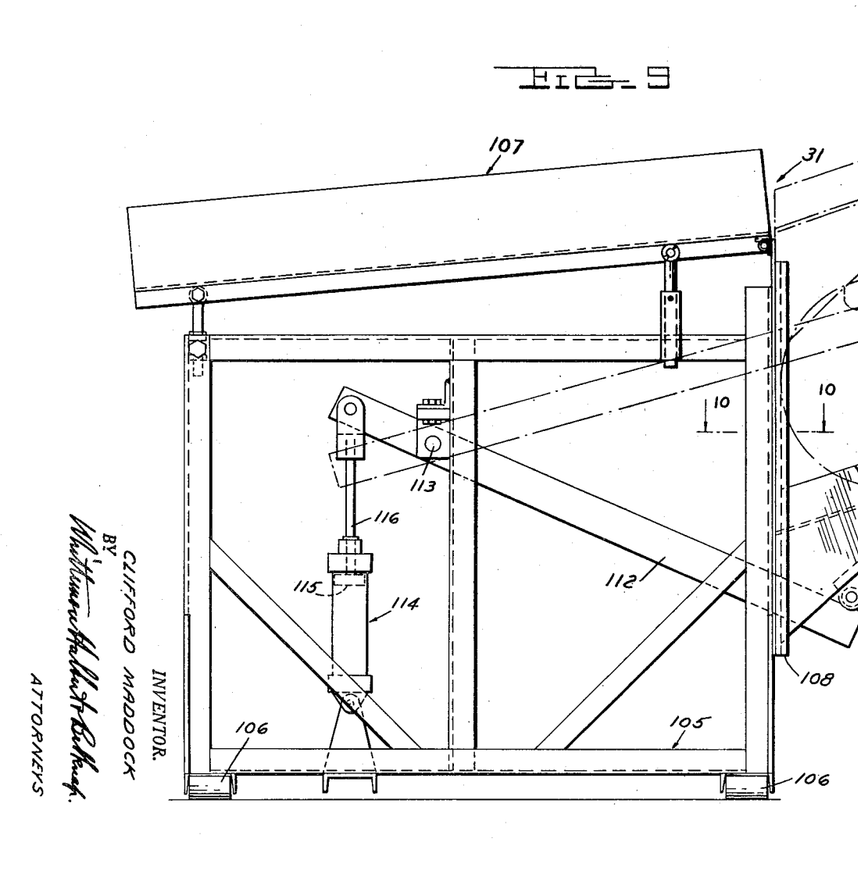
Figure 9 is a side elevation view partly in section of a portion of the apparatus shown in Figure 1.
Figure 10:
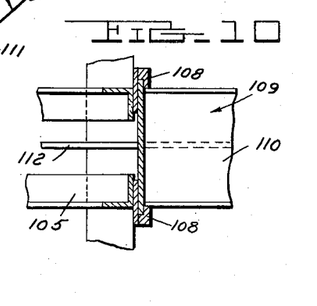
Figure 10 is a cross sectional view taken on the line 10—10 of Figure 9.

Referring now to Figures 2, 6 and 9 of the drawings, it will be noted that a plurality of arms 63 extend radially outwardly from the tubular shaft 62 in circumferential spaced relationship to provide spaces between adjacent arms of sufficient size to accommodate a rim blank B. In the present instance adjacent radially extending arms 63 are spaced approximately ninety degrees from one another and end plates 64 are respectively secured to opposite edges of the arms 63. As shown in Figure 5 of the drawings the end plates 64 project radially beyond the outer edges of the arms 63 and are connected together by cross members 65. The cross members 65 are spaced radially outwardly from the outer edges of the arms 63 to form clearance openings for pins 66 having the opposite ends anchored in the plates 64. Suitable sleeves 67 are respectively supported on the pins 66 in positions to have a bearing engagement with a rim blank B. Axial displacement of the rim blank relative to the fixture 61 in an outward direction is prevented by angular filler plates 68 respectively located between adjacent arms 63 at the outer side of the fixture and suitably secured to the shaft 62.

Figure 8:
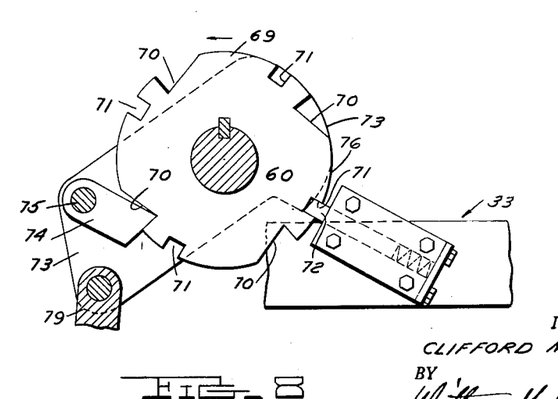
Figure 8 is a sectional view taken on the line 8—8 of Figure 5.

The fixture 61 is indexed to successively bring the spaces between adjacent arms 63 into registration with the delivery end of the chute 42 and this is accomplished by rotating the shaft 60 in a counterclockwise direction with a step by step movement. As shown in Figures 5 and 8 of the drawings in indexing wheel 69 is keyed to the outer end of the shaft 60 and four notches 70 are formed in the periphery thereof. The notches are spaced circumferentially of the wheel 69 at ninety degree intervals and a recess 71 is formed in the periphery of the wheel 69 at the leading side of each notch 70. A spring operated plunger 72 is supported on the auxiliary frame 33 adjacent the ratchet wheel 69 in a position to successively project into the recesses 71 and hold the fixture 61 in its indexed position.

A pair of plates 73 are rotatably supported on the shaft 60 at opposite sides of the wheel 69 and a pawl 74 is positioned between the plates 73. One end of the pawl is pivoted to the plates 73 by a pin 75 and the free end of the pawl 74 is positioned to ride on the periphery of the wheel 69. The arrangement is such that successive rotation of the plates 73 in opposite directions about the axis of the shaft 60 engages the free end of the pawl 74 in the notches 70 and advances the wheel 69 along with the fixture 61 with a step by step movement. Before the wheel 69 can be advanced by the pawl 74 it is necessary to disengage the plunger 72 from the adjacent recess 71 and this is accomplished by forming cam surfaces 76 on the top edges of the plates 73. As shown best in Figure 2 of the drawings the cam surfaces 76 have a bearing engagement with the plunger 72 and retract the latter from the adjacent recess 71 while the plates 73 are rotated in a direction to advance the pawl 74 to the next adjacent notch 70. It will be understood that the plunger 72 is released from the cam surfaces 76 during advancement of the indexing wheel so the plunger 72 is free to move into the next adjacent recess 71.

The plates 73 are successively rotated in opposite directions to accomplish the indexing operation by an air cylinder 77 having the lower end pivoted to the auxiliary frame 33 (Figures 2 and 5) and having a piston 78 slidably supported therein. The piston 78 is connected to the lower end of a rod 79 having the upper end pivoted to the plates 73. The air cylinder 77 is connected to the supply line 54 by a valve 80 positioned to be operated by a cam 81 on the piston rod 51 as the latter is moved downwardly by the piston 53 to retract the gate 48. Operation of the valve 80 energizes the normally open three-way master valve 81 to connect the upper end of the cylinder 77 to the exhaust and energizes the three-way normally closed time valve 82 to admit air under pressure to the lower end of the cylinder 77. As a result the piston 78 is moved upwardly in the cylinder 77 and the plates 73 are rotated in a clockwise direction to release the plunger 72 from the adjacent recess 71 in the indexing wheel 69. Continued rotation of the plates 73 in a clockwise direction engages the pawl 74 with one of the notches 70 in the indexing wheel 69.

As stated above, the valve 82 is a normally closed time type valve and after sufficient time has elapsed to enable the pawl 74 to engage in the next preceding notch in the indexing wheel 69, the valve 82 is opened. As a result the lower end of the air cylinder 77 is connected to exhaust and the valve 81 is operated to connect the upper end of the cylinder 77 to the supply line 54. Hence the piston 78 in the cylinder 77 is moved downwardly and the indexing wheel 69 is advanced in a counterclockwise direction to index the fixture 61. It will be apparent from the foregoing that although the fixture 61 is not indexed until after the gate 48 is retracted, nevertheless, a rim blank B on the delivery end of the chute is blocked from entering the fixture 61 either by a rim blank on the fixture or by the adjacent cross pin 66 of the fixture 61. Should there be a rim blank on the fixture 61 prior to indexing the latter, this rim blank is delivered to the conveyor mechanism 31 during the indexing movement of the fixture 61 and the rim blank B on the delivery end of the chute passes directly into the next succeeding space on the fixture during indexing of the latter.

It follows from the above that the fixture 61 is indexed in timed relation to movement of the gate 48 to its retracted position with respect to the chute 42. The arrangement is such that after the blank B on the chute 42 is transferred to the fixture 61, the gate 48 is returned to its blocking position with respect to the chute 42. In this connection, attention is again directed to Figure 12 of the drawings wherein it will be noted that the valve 58 is a normally closed three-way time valve which is set to connect the upper end of the cylinder 52 to exhaust and to operate the valve 59 to connect the lower end of the cylinder 52 to the supply line 54 after the rim blank B on the chute is advanced beyond the gate 48. Hence the piston 53 in the cylinder 52 is moved upwardly to return the gate 48 to its blocking position relative to the chute in order to hold the next rim blank B deposited on the delivery end of the chute 42 in position on said chute.

As will be presently set forth, the indexing fixture 61 is moved axially along the shaft 60 toward the rolling machine 15 after a rim blank has been deposited on the fixture 61. Hence it is desirable to provide means for rendering the valve 55 inoperative by a rim blank at the receiving end of the chute 42 until the fixture 61 is returned to its normal position shown in Figure 5 of the drawings. In order to accomplish this result a so-called straight way pilot valve 83 is supported beneath the chute 42 at the delivery end. The plunger of the valve projects through a clearance opening formed in the base 44 of the chute 42 and is engaged by a flap 84 hinged along its upper edge to the base 44 of the chute 42. Thus the flap 84 is engaged by a rim blank as it advances beyond the gate 48 and downward movement of the flap 84 by the rim blank operates the valve 83 to connect both of the valves 55 and 57 to exhaust. The master valve 57 remains closed or connected to the exhaust to render the valve 55 inoperative until the indexing fixture 61 is returned to its normal position shown in Figure 5 of the drawings. When the fixture 61 returns to its normal position, a valve 85 is operated in a manner to be presently described to again open the master valve 57 and render the valve 55 operative.

Figure 11:
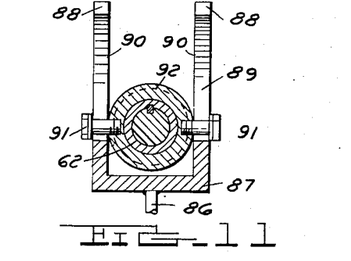
Figure 11 is a sectional view taken on the line 11—11 of Figure 5.

The means for sliding the fixture 61 along the shaft 60 comprises an arm (Figure 5) 86 pivoted at the lower end on the auxiliary frame 33 and having a bifurcated part 87 at the upper end. The furcations 88 of the bifurcated part 87 respectively project upwardly along opposite sides of the tubular shaft 62 adjacent the outer end of the latter. It will also be noted that the furcations 88 have vertically elongated slots 89 therethrough and the slots are curved upwardly and outwardly with respect to the tubular shaft 61. The opposite side walls 90 of the slots 89 form cam surfaces which engage pins (Fig. 11) 91 extending outwardly in diametrically opposed relationship from a ring 92 which is rotatably supported on the shaft 62 at the outer side of the arms 63 on the fixture 61.

The above arrangement is such that swinging movement of the arm 86 in the direction of the arrow 93 (Fig. 5) slides the fixture 61 in an inward direction from its normal position toward the rolling machine 15 and swinging movement of the arm 86 in the opposite direction returns the indexing fixture 61 to its normal position. The arm 86 is operated by a fluid cylinder 94 having the lower end pivoted as at 95 to the auxiliary frame 33 and having a piston 96 slidably supported therein. The piston 96 is connected to the lower end of a rod 97 and the upper end of the rod is pivoted as at 98 to the arm 86 intermediate the ends thereof.

The air cylinder 94 is operated in timed relation to rotation of the indexing fixture 61 by a so-called straight way cam valve 99 shown in Figure 12 of the drawings as positioned for operation by a cam 100 secured to the connecting rod 79 for the air cylinder 77. The valve 99 is operated as the piston 78 in the air cylinder 77 approaches its lowermost position in the cylinder or in other words upon completion of the indexing operation. Actuation of the valve 99 operates a three-way normally closed master valve 101 and a three-way normally open master valve 102. In detail, valve 101 is opened to the air supply line 54 and air under pressure is supplied to the top of the cylinder 94. Also air under pressure is admitted to the valve 102 and the latter is closed to connect the lower end of the cylinder 94 to exhaust. Hence the piston 96 is moved to the lower end of the cylinder 94 and the arm 86 is swung in the direction of the arrow 93 to shift the indexing fixture 61 to its innermost position with respect to the rolling machine 15. As the indexing fixture 61 approaches its innermost position adjacent the rolling machine 15, a valve 103 (Figure 5) is operated by the indexing fixture. The valve 103 initiates the operation of the power means, not shown, of the rolling machine for moving the bottom forming roll 20 in an upward direction toward the top forming roll 18, as shown in Figure 7 of the drawings.

As a result of the foregoing, the blank B is raised by the bottom forming roll 20 off of the indexing fixture 61 and into engagement with the top forming roll 18. Since the forming rolls are driven, it follows that the blank B is rolled to the cross sectional contour determined by the forming rolls and upon completion of this rolling operation the bottom roll 20 is lowered in accordance with conventional practice. As the bottom roll 20 approaches its lowermost position the block 22 operates a valve 104 shown in Figures 7 and 12 of the drawings. Actuation of the valve 104 causes the valve 101 to connect the upper end of the cylinder 94 to exhaust and causes the valve 102 to connect the lower end of the cylinder 94 to the supply line 54. As a result the piston 96 in the cylinder 94 is moved upwardly and the arm 86 is swung in an outward direction to return the indexing fixture 61 to its normal position shown in Figure 5 of the drawings. Inasmuch as the rim blank B is returned to a position on the indexing fixture upon downward movement of the bottom forming roll 20 it follows that the blank is also returned with the fixture to the normal position thereof. As hereinbefore stated, the valve 85 is operated when the fixture 61 is returned to its normal position with the result that the master valve 57 is again opened to the supply line 54 and the valve 55 is rendered operative to effect the next cycle of operation.

As shown in Figure 9 of the drawings, when the indexing fixture 61 is rotated during the next cycle of operation the rim blank thereon is delivered to the conveyor mechanism 31. The conveyor mechanism 31 is supported at the delivery side of the indexing fixture 61 and has a frame structure 105 which in the present instance is formed separately from the main and auxiliary frames 32 and 33 respectively. The frame structure 105 is also supported on rollers 106 to facilitate positioning of the same and if desired may be attached to the base of the rolling machine. In any case, a conveyor comprising a chute 107 is secured to the top of the frame structure 105 at an elevation above the indexing fixture 61. The chute 107 is inclined in a downward direction from the front end thereof to enable rim blanks to be conveyed along the chute by the action of gravity.

Supported at the front side of the frame structure 105 is a vertically extending guide 108 and this guide forms a support for an elevator 109. The elevator 109 has a chute 110 which is inclined in a downward direction from the front end thereof and a follower roller 111 is supported on the elevator 109 at the bottom of the latter for engagement with the front end of an actuating arm 112. The arm 112 is pivoted intermediate the ends on the frame structure 105 by a pin 113 and the rear end of the arm 112 is connected to an air cylinder 114. The lower end of the cylinder 114 is pivoted to the frame structure 105 and a piston 115 is slidably supported in the cylinder 114. The piston 115 is connected by a rod 116 to the rear end of the actuating arm 112.

The elevator 109 is shown in Figure 9 in its lowermost position wherein it receives a rim blank B from the indexing fixture 61 and is movable to the broken line position shown in Figure 9 by the air cylinder 114 to deposit the rim blank in the chute 107. The air cylinder 114 is operated by a three-way cam valve 117 supported below the chute 110 of the elevator 109 and having a plunger which extends upwardly through a clearance opening in the bottom of the chute 110. The plunger of the valve 117 is connected to a flap 118 having a front edge hinged to the base of the chute 110 and positioned for operation by a rim blank B deposited on the chute 110.

As shown in Figure 12 of the drawings, actuation of the valve 117 operates a three-way normally closed time valve 119 and a three-way normally open master valve 120. The arrangement is such that the upper end of the cylinder 114 is connected to the supply line 54 and the lower end is connected to exhaust so that the piston 115 is moved downwardly to elevate the elevator 109 to its broken line position shown in Figure 9. After a predetermined time interval, the valve 119 operates to reverse the action of the air cylinder 114 and return the elevator 109 to its lowermost position. It is pointed out at this time that flow control valves 121 are used throughout the system wherever it is desired to regulate the flow of fluid under pressure.

It will be understood from the foregoing that the delivery end of the chute 107 may be connected to the receiving end of a chute 42 of another rim handling apparatus so that the rim may be automatically handled throughout all of the stages of the required rolling operations. The additional apparatus required for handling the rim throughout the entire cycle of the rolling operation is the same as the one previously described and hence need not be shown herein.

Operation

The operation of the apparatus will be clearly understood from the foregoing description and hence need not be described in detail. Briefly, a rim blank B deposited on the receiving end of the chute 42 depresses the flap 56 and operates the valve 55. Operation of the valve 55 renders the air cylinder 52 operative to retract the gate 48 from the path of travel of the blank B. As a result the blank B is permitted to roll by gravity into one of the spaces provided between the arms 63 of the indexing fixture 61. As the rim blank leaves the delivery end of the chute 42 it depresses the flap 84 and operates the valve 83 to render the valve 55 inoperative. The gate 48 is returned after a predetermined time interval by the air cylinder 52 to its blocking position with respect to the chute 42 so that the next rim blank applied to the chute is held thereon.

As the piston 53 of the air cylinder 52 moves downwardly to retract the gate 48 the cam 81 on the piston rod 51 operates the valve 80 and energizes the air cylinder 77 to move the plate 73 in a counterclockwise direction. Movement of the plates 73 in a counterclockwise direction positions the pawl 74 (Fig. 8) into the next adjacent notch on the indexing wheel 69 so that the fixture 61 may be indexed upon downward movement of the piston 78 in the cylinder 77. As pointed out above, downward movement of the piston 78 in the cylinder 77 is accomplished by the time valve 82. As the piston 78 approaches its lowermost position in the cylinder 77 the cam 100 on the piston rod operates the time valve 99 to energize the air cylinder 94 and shift the indexing fixture 61 inwardly to place the blank in operative relationship to the forming rolls 18 and 20.

As the indexing fixture 61 approaches its innermost position relative to the rolling machine 15 it operates the valve 103 and the latter causes the forming roll 20 to move upwardly. Upward movement of the roll 20 lifts the rim blank B off the fixture 61 and clamps the wall of the blank against the cooperating forming roll 18 to effect the rolling operation. Upon completion of the rolling operation the roll 20 is lowered and the rim blank B is returned to the fixture 61. Also as the roll 20 moves downwardly it operates the valve 104 and the latter energizes the air cylinder 94 to return the indexing fixture 61 with the rim blank thereon to its normal position shown in Figure 5 of the drawings. As the indexing fixture 61 approaches its normal position, the arm 86 operates the valve 85 and the latter again connects the valve 57 to the air supply line to render the valve operative to effect the next cycle of operation.

Rotation of the indexing fixture 61 during the next cycle of operation deposits the rim blank B on the fixture in the chute 110 of the elevator 109 and the flap 118 is operated by the rim blank. Downward movement of the flap 118 operates the valve 117 to energize the air cylinder 114 and the latter raises the elevator 109 to a position wherein the chute 110 registers with the receiving end of the conveyor chute 107. Thus the rim on the elevator 109 rolls by gravity along the chute 107 to the chute 42 of the next loading apparatus or to a receiving station. In any case, after a predetermined interval of time lapses the air cylinder 114 is energized to return the elevator 109 to its lowermost position shown in Figures 1 and 9 of the drawings.

What I claim as my invention is:

1. Apparatus for feeding annular rim blanks to and from a working position, said apparatus comprising a carrier supported to one side of the working position for movement in directions toward and away from the working position from a normal position spaced laterally outwardly from the working position, means on the carrier for supporting an annular rim blank in a position opposite the working position, means for feeding rim blanks to the carrier comprising a chute supported in a position with the delivery end registerable with the carrier in the normal position of the latter, a stop positioned in the path of travel of a blank on the chute and movable out of the path of travel of the blank, and means operated by a rim blank on the chute for operating said stop.

2. The apparatus defined in claim 1 comprising an operating element positioned for operation by a rim blank moving along the chute beyond the stop, and means operated by said element for rendering the stop operating means inoperative to move said stop out of the path of travel of a rim blank on said chute.

3. The apparatus defined in claim 1 comprising means operating in timed relation to movement of a rim blank on the carrier to shift said carrier in a direction toward the working position.

4. The apparatus defined in claim 1 comprising an operating element positioned for operation by a rim blank moving along the chute beyond the stop, means operated by said element for rendering the stop operating means inoperative to move said stop out of the path of travel of a rim blank on said chute, means for moving said carrier toward and away from the rolling machine, and means for rendering said stop operating means operative in response to return movement of said carrier to its normal position.

5. In combination, a rim rolling machine having opposed rotatable forming rolls supported for relative movement in directions toward and away from one another into and out of rolling contact with opposite sides of a wall of an annular rim blank, a carrier supported to one side of the rolling machine for movement in directions toward and away from the rolling machine from a normal position spaced laterally outwardly from the rolling machine, means on the carrier for supporting an annular rim blank in a position opposite the forming rolls, means for moving the carrier inwardly toward the rolling machine to position the wall of a rim blank on the carrier between the forming rolls, means operated by the carrier as it approaches its innermost position relative to the rolling machine to relatively move the forming rolls toward one another into rolling engagement with the wall of the blank, and means for operating the carrier moving means to return said carrier to its normal position in response to relative movement of the forming rolls in directions away from one another.

6. Apparatus for feeding annular rim blanks to and from a working position, said apparatus comprising a carrier in the form of an indexing fixture having a shaft positioned to one side of the working position and having rim blank supporting means comprising members extending outwardly from the shaft in circumferential spaced relationship to provide open spaces between adjacent members for accommodating an annular rim blank, means supporting the shaft for rotation and for axial sliding movement toward and away from the working position from a normal position spaced laterally outwardly from the working position to locate a rim blank on the fixture at the working position, and indexing means for rotating the shaft to successively bring the spaces between adjacent members to a rim blank receiving position at the top of the shaft.

7. The apparatus defined in claim 6 wherein the indexing means is operated to rotate the shaft in timed relation to return movement of the fixture to its normal position, and means operating in timed relation to the indexing means for depositing a rim blank in the uppermost space of the fixture.

8. Apparatus for feeding annular rim blanks to a working position, said apparatus comprising a carrier supported to one side of the working position for movement in directions toward and away from the working position from a normal position spaced laterally outwardly from the working position, means on the carrier for supporting an annular rim blank in a position opposite the working position, means for moving said carrier inwardly from its normal position to locate a rim blank on the carrier at the working position and for moving said carrier with the rim blank thereon back to the normal position of the carrier, a conveyor supported at an elevation above the carrier and extending in a direction away from the carrier, an elevator supported between the carrier and receiving end of the conveyor for movement from a position adjacent the carrier to a position in registration with the receiving end of the conveyor, and means operating in timed relation to return movement of the carrier to its normal position to move a rim blank from the carrier to a position on said elevator.

9. The apparatus defined in claim 8 having means operating in timed relation to movement of a rim blank on the elevator to raise said elevator to a position in registration with the receiving end of the conveyor.

10. The apparatus defined in claim 9 wherein the conveyor comprises a chute which slopes downwardly from the receiving end and wherein the elevator has a platform for the rim blank which is sloped in the same direction as the conveyor chute.

11. Apparatus for feeding an annular rim blank to a working position, said apparatus comprising a rotatable carrier supported to one side of the working position for movement along its axis in directions toward and away from the working position from a normal position spaced laterally outwardly from the working position, means on the carrier for supporting an annular rim blank in a position opposite the working position, means for moving said carrier inwardly from its normal position to locate a rim blank on the carrier at the working position and for moving said carrier with the rim blank thereon back to the normal position of the carrier, means operating in timed relation to movement of the carrier to its normal position to rotate said carrier about its axis to discharge the rim blank therefrom, and means operating in timed relation to removal of the rim blank from the carrier to deposit a rim blank on said carrier.

12. The apparatus defined in claim 11 wherein the means for depositing a rim on the carrier comprises a chute supported at an elevation above the carrier and inclined in a direction toward said carrier to feed rim blanks to the carrier by the action of gravity, a stop positioned in the path of travel of a rim blank on the chute and movable out of the path of travel of the rim blank in timed relation to return movement of the carrier to its normal position.

13. In combination a rim rolling machine having a pair of spaced parallel shafts supported for relative movement in directions toward and away from one another, opposed forming rolls respectively supported on the other ends of said shafts for rotation and movable by said shafts into and out of rolling contact with opposite sides of a wall of an annular rim blank, a carrier supported to one side of the rolling machine for movement in directions toward and away from the rolling machine from a normal position spaced laterally outwardly from the rolling machine, means on the carrier for supporting an annular rim blank in a position opposite the forming rolls, means for moving the carrier inwardly toward the rolling machine to position the wall of a rim blank on the carrier between the forming rolls, means operated by the carrier as it approaches its innermost position relative to the rolling machine to relatively move the shafts toward one another to bring the forming rolls into rolling engagement with the wall of the blank, and means for operating the carrier moving means to return said carrier with the rim blank thereon to its normal position in response to relative movement of the shafts in directions away from one another.

14. In combination a rim rolling machine having opposed rotatable forming rolls supported for relative movement in directions toward and away from one another into and out of rolling contact with opposite sides of a wall of an annular rim blank, a single rotatable carrier device supported to one side of the rolling machine for movement in directions toward and away from the rolling machine from a normal position spaced laterally outwardly from the rolling machine, means on the carrier device for supporting an annular rim blank in a position opposite the forming rolls, means operative in timed relation to relative movement of the forming rolls toward one another to move said carrier device inwardly from its normal position to locate the wall of a rim blank on the carrier device between the forming rolls and operative in timed relation to relative movement of the forming rolls in directions away from one another to move said carrier device with the rim blank thereon back to the normal position of the carrier device, and means operative in timed relation to movement of said carrier device to normal position for rotating said carrier device about its axis to discharge the rim blank therefrom.

15. In combination, a rim rolling machine having opposed rotatable forming rolls supported for rotation about parallel axes and for relative movement in directions toward and away from one another into and out of rolling contact with opposite sides of a wall of an annular rim blank, a carrier in the form of an indexing fixture having a shaft positioned to one side of the rolling machine with its axis extending substantially parallel to the axes of rotation of the forming rolls and having rim blank supporting means comprising members extending outwardly from the shaft in circumferentially spaced relationship to provide open spaces between adjacent members for accommodating a rim blank, means suporting the shaft for rotation and for axial sliding movement toward and away from the rolling machine from a normal position spaced laterally outwardly from the rolling machine to locate a rim blank on the fixture with the wall thereof between the opposed forming rolls, indexing means for rotating the shaft to successively bring the spaces between adjacent members to a rim blank receiving position at the top of the shaft, said indexing means being operated to rotate the shaft in timed relation to return movement of the fixture to its normal position, and means operating in timed relation to relative movement of the forming rolls in opposite directions to slide the fixture toward and away from the rolling machine.

16. In combination, a rim rolling machine having opposed rotatable forming rolls supported for rotation about parallel axes and for relative movement in directions toward and away from one another into and out of rolling contact with opposite sides of a wall of an annular rim blank, a carrier in the form of an indexing fixture having a shaft positioned to one side of the rolling machine with its axis extending substantially parallel to the axes of rotation of the forming rolls and having rim blank supporting means comprising members extending outwardly from the shaft in circumferentially spaced relationship to provide open spaces between adjacent members for accommodating a rim blank, means supporting the shaft for rotation and for axial sliding movement toward and away from the rolling machine from a normal position spaced laterally outwardly from the rolling machine to locate a rim blank on the fixture with the wall thereof between the opposed forming rolls, indexing means for rotating the shaft to successively bring the spaces between adjacent members to a rim blank receiving position at the top of the shaft, means operating in timed relation to relative movement of the forming rolls toward one another to slide the fixture toward the rolling machine to locate the wall of the rim blank on the fixture between the opposed forming rolls, means operating in timed relation to relative movement of the forming rolls away from one another to return the fixture with the rim blank to the normal position of the fixture, and means operated by the fixture as it approaches its normal position to initiate the operation of the indexing means.

17. The apparatus defined in claim 16 having means operating in timed relation to the indexing means for depositing a rim blank in the uppermost space on the fixture.

References Cited in the file of this patent

UNITED STATES PATENTS

| | | |
|---|---|---|
| 1,687,468 | Drink | Oct. 9, 1928 |
| 1,767,826 | Wiles | June 24, 1930 |
| 1,939,577 | Sneed | Dec. 12, 1933 |
| 2,268,330 | Bovee | Dec. 30, 1941 |